Figure 1:
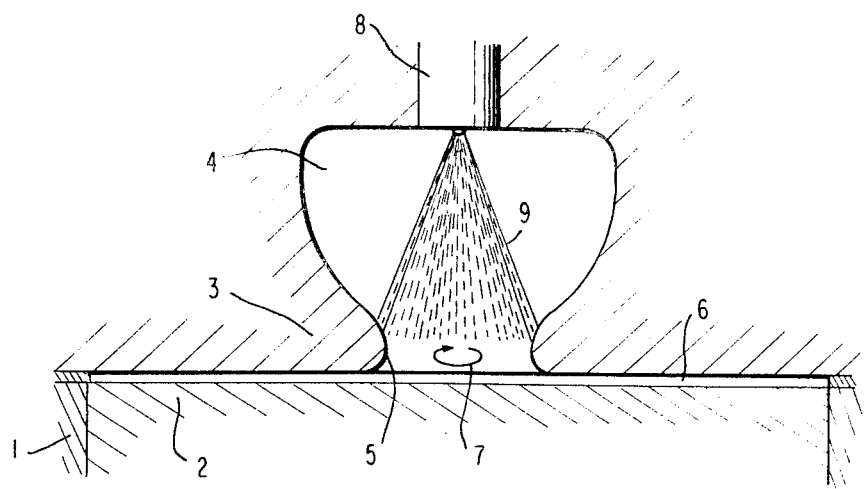

United States Patent [11] 3,610,211

[72] Inventors Heinrich Hoffmann
 Stuttgart-Geroksruhe;
 Horst Hardenberg, Stuttgart-Unterturkheim, both of Germany
[21] Appl. No. 833,065
[22] Filed June 13, 1969
[45] Patented Oct. 5, 1971
[73] Assignee Daimler-Benz Aktiengesellschaft
 Stuttgart-Unterturkheim, Germany
[32] Priority June 15, 1968
[33] Germany
[31] P 17 51 542.3-13

[54] COMBUSTION PROCESS OF AN AIR-COMPRESSING, AUTOIGNITING INJECTION-TYPE INTERNAL COMBUSTION ENGINE WITH PRECHAMBER AS WELL AS INTERNAL COMBUSTION ENGINE FOR CARRYING OUT SUCH PROGRESS
10 Claims, 2 Drawing Figs.
[52] U.S. Cl. .................................................. 123/30 D,
 123/32, 123/32 C
[51] Int. Cl. ............................................... F02b 19/00
[50] Field of Search ......................................... 123/30,
 30.2, 30.21, 32

[56] References Cited
UNITED STATES PATENTS
1,874,994 8/1932 Hehr .............................. 123/32
2,561,628 7/1951 Kogel ............................ 123/32
2,762,348 9/1956 Meurer .......................... 123/32
2,933,072 4/1960 Nallinger ....................... 123/32
3,386,422 6/1968 Eyzat ............................ 123/32

Primary Examiner—Laurence M. Goodridge
Attorney—Craig, Antonelli, Stewart and Hill ABSTRACT: A combustion process for an air-compressing, autoigniting injection-type internal combustion engine as well as an internal combustion engine for carrying out such process, in which fuel is injected from an injection nozzle arranged in the prechamber in such a manner that the fuel jet is injected in a direction opposite the swirling, in-flowing combustion air so that the fuel and combustion air cross one another, a portion of the fuel is torn up by the in-flowing vortexing combustion air while another portion of the fuel is applied filmlike against the wall of the prechamber discharge channel, from which it is detached in vapor form by the in-flowing air and by the charge flowing out of the prechamber.

INVENTORS
HEINRICH HOFFMANN
HORST HARDENBERG

BY Craig, Antonelli, Stewart & Hill
ATTORNEYS

COMBUSTION PROCESS OF AN AIR-COMPRESSING, AUTOIGNITING INJECTION-TYPE INTERNAL COMBUSTION ENGINE WITH PRECHAMBER AS WELL AS INTERNAL COMBUSTION ENGINE FOR CARRYING OUT SUCH PROGRESS

The present invention relates to a combustion process of an air-compressing, self-igniting injection-type internal combustion engine with a prechamber arranged essentially axially in the cylinder head and having a discharge channel tapering, i.e., narrowing slightly in the direction toward the cylinder space and with inflowing combustion air rotating about the cylinder axis which, during the compression stroke is displaced into the prechamber with increased angular velocity and continues to rotate therein, in which the fuel is injected by an injection nozzle arranged in the prechamber to a considerable extent air-distributed into the combustion air, as well as to an internal combustion engine for carrying out the process.

The conventional prechamber Diesel engines enable especially with small stroke-volume of the individual working cylinders, a soft and noiseless operation of the engine, desirable especially with passenger motor vehicles. Nevertheless, with these prior art engines, the throttle losses necessitated by the displacement operation between cylinder space and prechamber, inadequate air-utilization and poor smoke values are to be considered as needy of improvements.

The present invention aims at perfecting and improving the aforementioned combustion process and the internal combustion engine intended for carrying out such process to such an extent that notwithstanding the maintenance of the desired noise-free, soft operation of the engine, also the aforementioned shortcomings are avoided.

The underlying problems are solved in accordance with the present invention in that the fuel applied with its wider portion filmlike distributed in a conventional manner against the wall, is injected opposite the combustion air rotatingly flowing into the prechamber against the walls of the discharge channel so that injected fuel and inflowing combustion air cross one another and, owing to the corresponding, intensive tearing-up of the fuel-jet a considerable air-distributed fuel portion results which is rapidly prepared and ignited whereas the wall-distributed fuel portion is detached in vapor from by the air rotatingly displaced into the prechamber and by the charge again rotatingly flowing out of the prechamber is mixed with the air and combusted.

With such a process, the fuel portion applied against the wall of the discharge channel and therewith applied wall-distributed close to the discharge in relation to the prechamber, redetached, evaporated and combusted results in low-pressure rises and in a smooth and calm operation, in a good air utilization and efficiency, as well as in low smoke values. As a result of the crossing of the injected fuel with the combustion air, spirally flowing into the prechamber there results, however, simultaneously a considerable air-distributed fuel portion which ignites with a small ignition delay and assures flat pressure increases. Additionally, the considerable air-distributed fuel portion assures a favorable starting behavior of the still cold internal combustion engine.

According to a preferred embodiment of the process in accordance with the present invention, the predominant fuel portion is applied wall-distributed against the walls of the discharge channel and during the compression stroke nearly the entire combustion air is transferred or displaced into the prechamber.

An internal combustion engine preferred for carrying out the combustion process in accordance with the present invention includes according to the present invention a Venturi-shaped discharge channel tapering or narrowing to an interior width, which lies in the upper limit range of the interior widths of the known discharge channels. By such a construction of the discharge channel, the throttle losses disadvantageous with the prechamber engines customary heretofore, during the displacement of the combustion air into the prechamber and during the overflow of the charge out of the prechamber into the main combustion chamber, are reduced to a minimum.

According to a further, also preferred construction of the present invention, the injection nozzle arranged axially to the prechamber is constructed as cone-shaped nozzle producing a jet forming cone-shaped shell i.e., a hollow jet with a thin cone-shaped outer surface directed against the tapering or restricted part of the discharge channel whereby the aimed-at air-distribution of a considerable portion of the injected fuel is achieved particularly favorably. Due to the fact that the combustion air flowing into the prechamber breaks through the only thin, conically shaped layer of fuel-jet, there is obtained an effective tearing-up of a considerable portion of the injected fuel which is rapidly prepared and ignited with small ignition delay.

In another embodiment of the present invention, there is proposed that the injection nozzle is arranged at the free end of a pin extending through the prechamber in the direction toward the discharge channel up to and in front of the constricted portion thereof. By such an extension of the injection nozzle, the latter is intensively acted upon and scavenged by the entering fresh gases whereas the residual gases remaining in the prechamber and stemming from the preceding operating cycle are displaced back into the portion of the prechamber disposed toward the rear of the nozzle so that the fuel traverses only pure air from the injection nozzle up to whereby impingement place at the wall of the discharge channel which produces a better and more rapid preparation of the air-distributed fuel portion and therewith a particularly small ignition delay and low-pressure rises.

Finally, it is additionally proposed in accordance with the present invention, to construct the prechamber by a heat-insulated insert of conventional construction whereby the prechamber can be kept at a temperature necessary for the optimum mixture formation.

A filmlike, wall-distributed fuel application in Diesel internal combustion engines is known, as such, for quite some time. However, it took place heretofore above all in the piston combustion spaces and thus preferred in the inflow direction of the combustion air flowing spirally into the piston combustion space. Apart from the disadvantage of a more difficult heat-removal from the piston combustion spaces, such a combustion process entails also ignition difficulties in particular with a still cold internal combustion engine, whence with these known, prior art Diesel engines for the most part still other special measures are necessary for the starting. The process now proposed herein of intersection of the fuel injected against a combustion space wall by the combustion air flowing into the prechamber was not suggested by the known injection into a piston combustion space.

Accordingly, it is an object of the present invention to provide a combustion process for an air-compressing, autoigniting injection-type internal combustion engine with prechamber as well as an internal combustion engine for carrying out such process which avoids by simple means the aforementioned shortcomings and drawbacks encountered in the prior art.

Another object of the present invention resides in a combustion process for an internal combustion engine of the injection type as well as in an internal combustion engine for carrying out such process in which the throttling losses on the part of the air flowing from the cylinder space into the prechamber and of the charge flowing out of the prechamber into the cylinder space are minimized while simultaneously the air efficiency is increased and improved smoke values are achieved.

A further object of the present invention resides in a combustion chamber for an injection-type Diesel engine with prechamber which assures noise-free, soft operation of the engine while facilitating the cold-starting of the engine without the need for special measures.

Still a further object of the present invention resides in a combustion process for an internal combustion engine of the type described above as well as in an internal combustion engine for carrying out such process which not only assures an improved starting behavior of the engine but additionally improves its efficiency during normal operation with low-pressure rises during the combustion.

Figure 2:
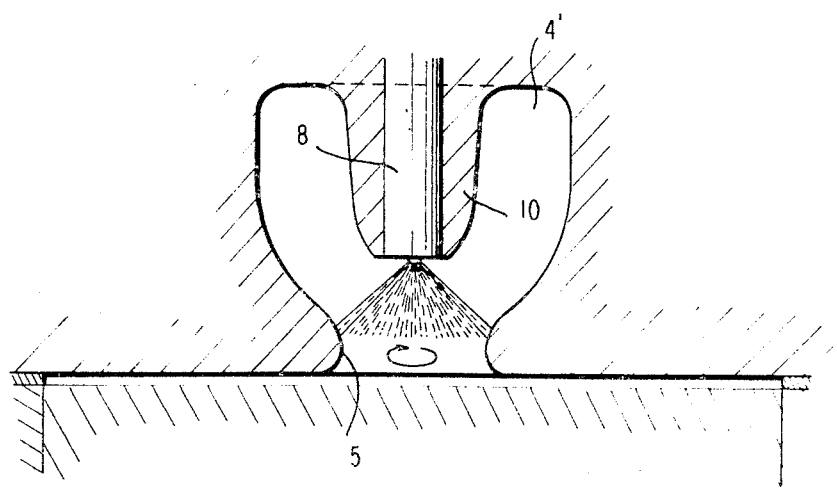

These and further objects, features and advantages of the present invention will become more obvious from the following description when taken in connection with the accompanying drawing which shows, for purposes of illustration only, two embodiments in accordance with the present invention, and wherein:

FIG. 1 is a schematic partial axial cross-sectional view through a working cylinder of a first embodiment of a prechamber Diesel internal combustion engine in accordance with the present invention illustrating the combustion space arrangement; and FIG. 2 is a schematic partial axial cross-sectional view, similar to FIG. 1, through a second embodiment of a prechamber Diesel internal combustion engine in accordance with the present invention. Referring now to the drawing wherein like reference numerals are used throughout the two views to designate like parts, and more particularly to FIG. 1, the prechamber Diesel internal combustion engine illustrated therein in its combustion space arrangement and corresponding to the first embodiment, includes in its working cylinder 1 a working piston 2 constructed as flat piston which reciprocates conventionally in the cylinder 1 and which, during its work stroke transmits the pressure force exerted thereon as driving torque to the crankshaft of the internal combustion engine rotatingly driven thereby.

An axially symmetrically, approximately semispherically shaped prechamber 4 is arranged in the cylinder head 3 of the internal combustion engine which accommodates nearly the entire charge in the compression end position of the working piston 2 and is in communication with the cylinder space 6 at its bottom side, opposite its flat side, by way of a Venturi-shaped tapering restricted discharge channel 5. The interior width of the discharge channel 5 lies in the upper boundary range of the known discharge channels so that only minimal throttle losses can occur during the displacement of the combustion air, which flows into the cylinder space with a vortexing or rotating movement by conventional means (not shown), into the prechamber 4 with a vortex or swirl indicated by the arrow 7 in FIG. 1 and also during the overflow of the charge out of the prechamber 4 into the main combustion space.

An injection nozzle 8 arranged axially in the prechamber 4 in a conventional manner is constructed as conical nozzle producing a jet of conical shell shape i.e., the hollow jet with conical outer surface directed against the tapering or narrowing portion of the discharge channel 5.

During the operation of the described internal combustion engine, the combustion air flowing with only small throttle losses into the prechamber 4 with a rotating or swirling movement brings about not only a good scavenging of the prechamber but simultaneously crosses during its inflow the conically shaped shell of jet 9 of the injection nozzle 8 whereby a considerable portion of the injected fuel is rapidly torn up and prepared and thus is ignited with only slight ignition delay and therewith effects a flat pressure rise. The wall application of the fuel portion in proximity to the discharge reaching up to the walls of the discharge channel 5 also produces small pressure rises and a smooth operation, good air efficiency and low smoke values.

In the combustion space arrangement illustrated in FIG. 2 and corresponding to the second embodiment, the injection nozzle 8 is arranged at the free end of a pin 10 extending through the prechamber 4' in the direction toward the discharge channel 5 up to in front of the restricted portion thereof. Such an extended arrangement off the injection nozzle 8 in the direction of the main combustion space produces, in addition to the effect of increasing the wall-distributed fuel-portion, additionally the advantage that the injection nozzle 8 is acted upon in an improved manner by the fresh gas entering the prechamber 4' and is scavenged thereby while the residual gases remaining from the preceding operating cycle in the prechamber are pushed back into the portion of the prechamber 4' disposed to the rear of the nozzle so that the fuel flows from the injection nozzle 8 up to the impingement place at the wall of the discharge channel 5 only through pure air which produces a better and more rapid preparation of the air-distributed fuel-portion and therewith a smaller ignition delay and lower pressure rises.

While we have shown and described only two embodiments in accordance with the present invention, it is understood that the same is not limited thereto but is susceptible of numerous changes and modifications as known to a person skilled in the art. Thus, in particular it is not necessary that the prechamber accommodates nearly the entire charge in the compression end position of the working piston 2. Furthermore, the prechamber may be constituted in both embodiments by a heat-insulating insert of conventional construction whereby the prechamber can be kept particularly favorable at the temperature necessary for an optimum mixture formation. Thus, the present invention is not limited to the details shown and described herein but is susceptible of numerous changes and modifications as known to a person skilled in the art, and we therefore do not wish to be limited to the details shown and described herein but intend to cover all such changes and modifications as are within the scope of those skilled in the art.

We claim:

1. A combustion process of an air-compressing, autoigniting injection-type internal combustion engine which includes an essentially axially arranged prechamber in the cylinder head and a discharge channel narrowing in the direction of the cylinder space, and in which the inflowing combustion air rotates about the cylinder axis which, during the compression stroke is transferred into the prechamber with increased angular velocity and continues to rotate therein, and in which fuel that is air-distributed to a considerable extent is injected into the compressed combustion air by an injection nozzle arranged in the prechamber, characterized by injecting a predominant portion of the fuel in a divergent conelike jet having a jet axis substantially parallel to the cylinder axis, with its wider portion filmlike and wall-distribed toward the wall portions of the discharge channel forming a constriction in a direction substantially opposite to the axial movement of the combustion air flowing through the discharge channel with a vortexing movement into the prechamber in such a manner that the injected fuel and inflowing air mutually cross and a considerable air-distributed fuel-portion results from the corresponding intensive tearing-up of the fuel-jet which is rapidly prepared and ignited whereas the wall-distributed fuel-portion is detached in vapor form by the air rotatingly displaced into the prechamber and by the charge again rotatingly flowing out of the prechamber, is mixed with the air and is then combusted.

2. A process according to claim 1, characterized in that during the compression stroke nearly the entire combustion air is displaced into the prechamber.

3. An air-compressing, autoigniting injection-type internal combustion engine having a prechamber means arranged essentially in the cylinder head, discharge channel means with wall portions thereof forming a nozzlelike constriction providing a communication between the prechamber means and a cylinder space, means for producing a combustion airflow in the cylinder space with a rotating movement about the cylinder axis, the rotating combustion air being displaced during the compression stroke into the prechamber means where it continues to rotate, and injection nozzle means arranged in the prechamber means for injecting fuel into compressed combustion air, characterized in that the injection nozzle means injects fuel in the form of a relatively thin divergent conelike layer and in a direction substantially opposite to the axial movement of flow of the rotating combustion form through the discharge channel means into the prechamber means, toward said wall portions of the discharge channel means in such a manner that the predominant portion of the fuel is applied wall-distributed against said wall portions of the discharge channel means and that the injected fuel and inflowing air mutually cross so that, as a result of the intensive tearing up of the fuel jet, a considerable air-distributed fuel portion results that is rapidly prepared and ignited whereas the remaining, predominant fuel-portion is wall-distributed in a filmlike manner along said wall portions of the discharge channel means, is redetached in vapor from by the rotating combustion air displaced into the prechamber means and by the charge again rotatingly flowing out of the prechamber means, is mixed with the air and is then combusted, and in that the discharge channel means is in the form of a single axial nozzle of relatively great diameter at the constriction formed by said wall portions and having nozzle walls that pass over smoothly into the walls of the prechamber means, on the one side, and into the walls of the cylinder head, on the other side, to minimize flow losses, the injection nozzle means being arranged substantially axially in relation to the prechamber means.

4. An internal combustion engine according to claim 3 characterized in that the injected fuel has approximately Venturi-shaped shape of a conical shell and impinges in its wider portion against the wall of the discharge channel means.

5. An internal combustion engine according to claim 3, characterized in that the discharge channel means is reduced Venturi-shaped to an internal width which lies within the upper limits of the interior widths of the known discharge channels.

6. An internal combustion engine according to claim 5, characterized in that the injection nozzle means is arranged at the free end of a pinlike portion extending through the prechamber means in the direction toward the discharge channel means up to the restricted portion thereof.

7. An internal combustion engine according to claim 6, characterized in that the prechamber means is constituted by a heat-insulating insert means.

8. An internal combustion engine according to claim 3, characterized in that the injection nozzle means is arranged at the free end of a pinlike portion extending through the prechamber means in the direction toward the discharge channel means up to the restricted portion thereof.

9. An internal combustion engine according to claim 3, characterized in that the prechamber means is constituted by a heat-insulating insert means.

10. An internal combustion engine according to claim 3, characterized in that during the compression stroke nearly the entire combustion air is displaced into the prechamber means.